(12) United States Patent
Bellanger

(10) Patent No.: US 6,377,192 B1
(45) Date of Patent: Apr. 23, 2002

(54) ELECTRONIC CONTROL SYSTEM

(75) Inventor: Regis Bellanger, Berthecourt (FR)

(73) Assignee: AGCO S.A. (FR)

( * ) Notice: Subject to any disclaimer, the term of this patent is extended or adjusted under 35 U.S.C. 154(b) by 0 days.

(21) Appl. No.: 09/295,833

(22) Filed: Apr. 21, 1999

(Under 37 CFR 1.47)

(30) Foreign Application Priority Data

Apr. 23, 1998 (GB) .............................................. 9808669

(51) Int. Cl.[7] .............................................. H03M 11/00
(52) U.S. Cl. ...................... 341/20; 74/471 XY; 74/528; 701/50; 305/145
(58) Field of Search .............................. 341/20; 701/50; 74/528, 471 XY; 305/145, 143, 144; 200/6 A

(56) References Cited

U.S. PATENT DOCUMENTS

| | | | | |
|---|---|---|---|---|
| 4,508,176 A | * | 4/1985 | Wiegardt et al. | |
| 5,831,554 A | * | 11/1998 | Hedayat et al. | ................ 341/20 |
| 5,887,669 A | * | 3/1999 | Ostler | ........................ 180/53.4 |
| 5,918,195 A | * | 6/1999 | Halgrimson et al. | .......... 702/94 |
| 6,061,617 A | * | 5/2000 | Berger et al. | .................. 701/50 |
| 6,065,365 A | * | 5/2000 | Ostler | ........................ 74/528 |
| 6,070,539 A | * | 6/2000 | Flamme et al. | ................ 701/50 |
| 6,108,948 A | * | 8/2000 | Tozawa et al. | ................ 37/348 |
| 6,115,660 A | * | 9/2000 | Berger et al. | .................. 701/50 |
| 6,131,062 A | * | 10/2000 | Nielsen | ........................ 701/50 |
| 6,216,794 B1 | * | 4/2001 | Buchl | ............................ 172/4 |
| 6,226,902 B1 | * | 5/2001 | Heyne | ......................... 701/45 |
| 6,233,511 B1 | * | 5/2001 | Berger et al. | .................. 701/50 |

* cited by examiner

Primary Examiner—Michael Horabik
Assistant Examiner—Albert K. Wong
(74) Attorney, Agent, or Firm—MacMillan, Sobanski & Todd, LLC

(57) ABSTRACT

In an electronic control system for controlling the setting of two or more continuously variable parameters, the system comprises a hand operated lever and electronic processing means 14 having an input from the lever 1 and output means for outputting a signal or signals representative of the said continuously variable parameters, characterised in that:

a) the lever 1 is arranged in a gate having two substantially parallel slots 3–5 and a transverse slot 6, the position of the lever 1 in each of the two parallel slots being substantially continuously variable and corresponding to a desired value for one or more of the said continuously variable parameters;

b) the processing means includes means 14 for storing a record of the position of the lever 1 in one of the said slots after the lever has been removed from the slot.

8 Claims, 1 Drawing Sheet

ELECTRONIC CONTROL SYSTEM

BACKGROUND TO THE INVENTION

The present invention relates to a system having a single manually operated lever for controlling more than one continuously variable parameter. The particular application described here is the control of more than one proportional hydraulic valve in an agricultural tractor.

As is well known, agricultural tractors usually have two or more hydraulic outlets to which agricultural implements having hydraulically powered functions may be connected. For example, a large reversible "semi mounted" plough would have a hydraulic cylinder for raising and lowering the plough on its support wheel, and also a hydraulically driven mechanism for reversing the orientation of the plough at each headland turn. Both of these functions would be powered from "auxiliary" hydraulic outputs on the tractor, and would be initiated and controlled by the operator from the tractor cab.

As many as six or more of these auxiliary outputs may be provided on the tractor and controlling the output at all of them so that the implement or implements attached to the tractor are correctly controlled can be difficult. Since the operations, eg for the above described plough, are often repetitive it is essential to make control of the supply to these outputs as convenient as possible to reduce operator fatigue.

It is known to have an electronic control system including continuously adjustable manual control members in the tractor cab for adjusting the setting of respective electro-hydraulic valves. Normally, the control members are continuously adjustable from a neutral position to a "maximum flow" setting in either direction from the neutral position. The control member may have to be moved against a spring to put it into a maximum flow setting, and the flow may be held at the maximum for a predetermined interval of time after the member has been released from the maximum flow position. The value of "maximum" flow may sometimes be preset using some other input means.

SUMMARY OF THE INVENTION

According to present invention an electronic control system is provided according to claim 1 hereto. The operator need only hold a single control lever or "joystick" to control several parameters, eg the settings of auxiliary hydraulic outputs on a tractor. One parameter (hydraulic output) may be adjusted to a desired value and then the lever moved to a different parallel slot to adjust another parameter (hydraulic output).

Preferable features are set out in the dependent claims. The advantages of these and other features will be apparent from the following description of one specific embodiment of the invention. The description is given by way of example only, with reference to the accompanying drawings.

DETAILED DESCRIPTION

Figure 1:
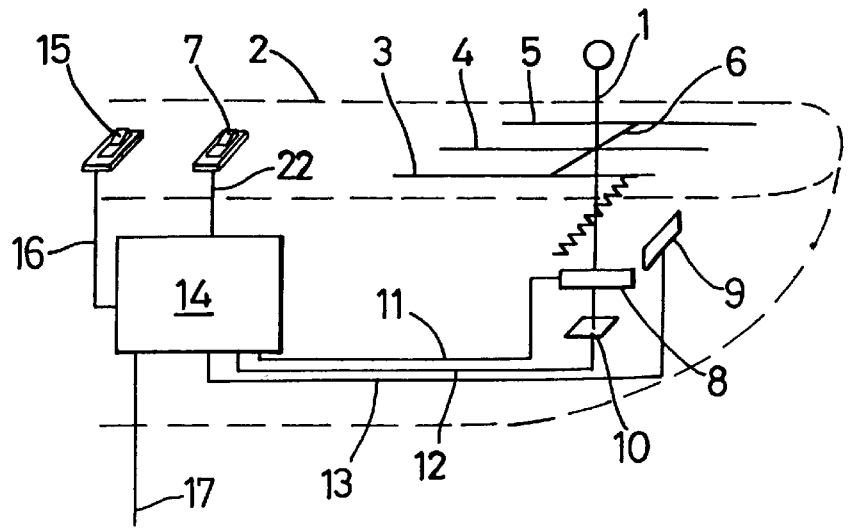
FIG. 1 is a schematic view of a control lever of a system in accordance with the invention.

Referring to FIG. 1, a manually operated control lever 1 is arranged in an "H" gate mounted in the arm rest 2 of the operator's seat of an agricultural tractor. The "H" gate comprises three parallel slots 3, 4, 5, with a single transverse slot 6 joining the parallel slots 3, 4, 5 at their centre points.

Inside the arm rest 2, adjacent the lower end of the lever 1 are "X" and "Y" direction lever position sensors 8, 9. These are shown highly schematically in the drawing and could be of any suitable type eg rotary potentiometers. A central position detecting switch 10 is also located at the lower end of the lever 1. Lines 11, 12, 13 lead to a processing unit 14 from the "X", "Y" sensors 8, 9 and the switch 10 respectively. A system enable/disable switch 15 and a valve group select switch 7 are also located on the arm rest 2, with lines 16, 22 leading from switches 15, 7 respectively to the processing unit 14. The valve select switch 7 might be more conveniently located on the lever 1 itself.

Figure 3:
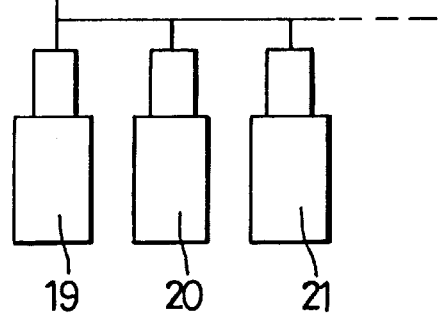
FIG. 3 is a diagrammatic representation of a cam system associated with the control lever system of FIG. 1.
Figure 3:
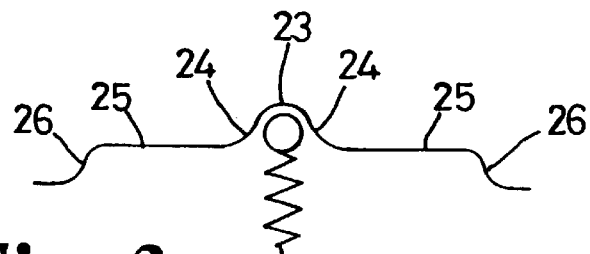

The lever is spring biased into the centre of the transverse slot 6. At the base of the lever is a system including a cam surface and sprung roller of a type well known in itself which biases the lever to the central point in each of the parallel slots 3, 4, 5. A certain amount of force is necessary to overcome this bias initially and then the lever will remain where it is pushed to in the slot 3, 4, 5 for the majority of the length of the slots. The lever must be pushed with additional force into a region at each end of each of the slots and, again, once this force is overcome the lever will remain in the position it is placed. FIG. 3 is a diagrammatic representation of the cam system showing the central point 23 and shoulders 24 on the cam surface which provide initial resistance to the lever being pushed out of the central position. Flat portions 25 are followed by further shoulders 26 providing resistance to the lever being pushed into the end regions of the slots 3, 4, 5.

In a modification of this embodiment, an additional flow setting button (not shown) is provided on the control lever 1, with a corresponding connection (not shown) into the processing unit 14. The button is used to set the flow at the position the lever 1 is in, allowing the lever to be removed to another slot without affecting the flow to the auxiliary output corresponding to the first slot.

Figure 2:
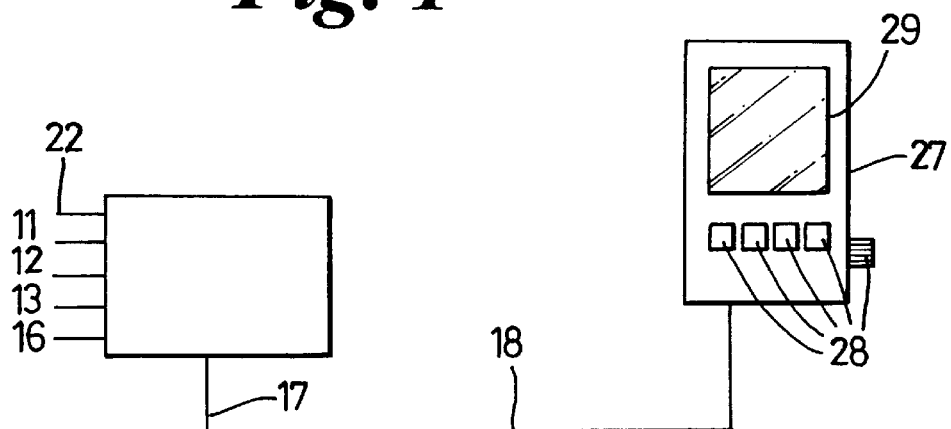
FIG. 2 is a diagrammatic representation of elements of a tractor electronic control system including the system in accordance with the invention.

A "CAN" connection 17 leads from the processing unit 14 into a "CAN BUS" tractor electronics system 18 (See FIG. 2). All of the electronic functions of the tractor are connected into the CAN BUS, including a series of proportional valves 19, 20, 21 controlling the output of hydraulic fluid to auxiliary hydraulic outputs (not shown) at the rear of the tractor. The valves 19, 20, 21 are of a known design incorporating electronic componentry which allows them to be controlled directly by signals from the CAN BUS.

A control console 27 in the tractor cab is also connected into the CAN BUS 18 having means 28 for inputting values for certain parameters relating to the control of functions of the tractor and means 29 for displaying those and other parameters.

The operation of the system will now be described.

The system will control the outputs at six auxiliary hydraulic valves (three of which 19, 20, 21 are shown in FIG. 2). When the system is first used, or at any time thereafter, the flow rates corresponding to the "maximum flow" settings of the lever 1 for each of the six valves are input into the system using the input means 28 on control console 27. If desired, a time for which maximum flow in either direction is maintained following the lever leaving the maximum flow position may also be set for each valve. Alternatively, for each valve the system may be set so there is no time limit for maximum flow.

Once set up, the operator need only move the control lever 1 in any of the three parallel slots 3, 4, 5 to adjust the first three valves and thus the flow rates to the first three hydraulic outputs. The lever 1 will remain at whatever position it is placed in one of the parallel slots. In addition, if it is pushed to a maximum flow position in any one slot 3, 4, 5 and then removed from that slot, the flow rate will be maintained either indefinitely or for to the time limit set for that valve until the lever re-enters that slot, at which point maximum flow will stop.

In the modification of this embodiment described above, the flow may be set at any rate by depressing the flow setting button whilst the lever 1 is at the desired position in the desired slot. This flow rate will then be maintained until the button is depressed again or until the lever is removed from the slot and then returned to it.

The fourth, fifth and sixth valves may be controlled in exactly the same manner in the system with or without the above described modification by operating the lever 1 with the valve group select button/switch 7 toggled.

The system may completely disabled by toggling the switch 15. This is useful for example when travelling on the road when it is important that any implement mounted on the tractor is not inadvertently activated.

What is claimed is:

1. An electronic control system for controlling the setting of two or more continuously variable parameters comprising:

a hand-operated lever arranged in a gate having a plurality of parallel slots and a traverse slot, the position of the lever in each of the parallel slots being continuously variable, wherein the lever outputs a value for one or more of the variable parameters corresponding to each slot and wherein the value corresponds to the position of the lever in the slot;

a setting means for outputting a setting signal; and an electronic processing means for receiving the values from the lever and for outputting parameter control signals wherein the processing means maintains a particular parameter control signal upon receiving the setting signal notwithstanding subsequent movement of the lever.

2. A system as claimed in claim 1 characterised in that at least one of the substantially parallel slots has an end region corresponding to a preset value of the parameter, the said processing means outputting a signal representative of the said preset value when the lever is moved into the said region.

3. A system as claimed in claim 2 characterised in that the said processing means continues to output the said signal representative of the preset value until the lever has been removed from the respective slot and then returned thereto.

4. A system as claimed in claim 2 characterised in that the said processing means continues to output the said signal representative of the preset value for a predetermined time after the lever has been removed from the said end region.

5. A system as claimed in claim 2 characterised by a manually operated switching means whereby a selection may be made between two or more continuously variable parameters associated with each parallel slot.

6. A system as claimed in claim 5 characterised in that the said switching means is mounted on the lever.

7. A system as claimed in claim 2 characterised in that the said gate has only three substantially parallel slots and in that the lever is biased towards the central parallel slot.

8. A system as claimed in claim 2 including a manually operable control for enabling or disabling the system.

* * * * *